Patented Dec. 10, 1946

2,412,264

UNITED STATES PATENT OFFICE 2,412,264

COMPOSITIONS OF MATTER AND METHODS AND STEPS OF MAKING AND USING THE SAME

Mortimer T. Harvey, South Orange, N. J., assignor to The Harvel Corporation, a corporation of New Jersey No Drawing. Application November 2, 1944, Serial No. 561,634

12 Claims. (Cl. 260—512)

This invention relates to novel sulphonated products as well as methods for preparing the same. This application is a continuation in part of my copending application Serial No. 461,600 filed October 10, 1942.

In its specific aspect this invention is directed to the methods for producing and the sulphonated products obtained by sulphonating the organic condensation reaction products produced by condensing a mixture of a phenol free of hydrocarbon substituents and of the class consisting of hydroxybenzene, naphthol, anthranol and their homologues with an alkyl ether of a phenol having an unsaturated hydrocarbon substituent. While a two-step process may be employed in order to produce my novel sulphonated products it is within the purview of this invention to produce the sulphonated products in a single main step by employing a reagent such as sulphuric acid or chlor sulfonic acid in such an amount that it serves both as a condensing agent and also as a sulphonating agent. The novel sulphonated products of this invention find application in the treatment of textiles and serve as good wetting agents therefor, and also as dye bases and perfume bases.

In the condensing reaction, the phenolic groups involved can be of the monohydric or the polyhydric type.

The condensation reactions are produced with the aid of kationic agents, also termed katenoid as well as kationoid condensing agents. The expression kationic, katenoid or kationoid condensing agent is used herein and in the claims in the sense of the recent electronic postulations of Robert Robinson, compare for instance his book on "Versuch einer Elektronentheorie Organischchemischer Reaktionen," Verlag Ferdinand Enke, Stuttgard 1932, especially page 16. Such agents are protons and sources of protons, such as acids, metal atoms which are able to form coordination systems with water or ammonia, sulfur from sulfur dioxide, sulfuric acid, sodium bisulfite, atoms and free radicals with incomplete electron shells and the like. Especially suitable have been found the following agents: sulphuric acid, phosphoric acid, zinc chloride, aluminum chloride, boron trifluoride, benzene sulfonic acid, hydrochloric acid and other kationoid agents. When employed solely as condensing agents they are used in small amounts and they do not enter into reactions with the above mentioned reacting compounds but remain unchanged and act, thus catalytically.

Following are illustrative examples of phenol ethers having unsaturated hydrocarbon substituents, which are suitable for use in the practice of the present invention: alkyl ethers of cashew nut shell liquid, of the distillate, as well as of the residue obtained from cashew nut shell liquid by heating said cashew nut shell liquid either at sub-atmospheric pressures or with steam, and also of the separate phenolic constituents thereof, namely anacardic acid and cardol; alkyl ethers of cardanol, cardanol itself being obtained by distilling the anacardic acid constituent and thereby dissociating therefrom carbon and oxygen atoms other than those of the phenol nucleus and the unsaturated hydrocarbon substituent; alkyl ethers of marking nut shell liquid and the phenolic constituents thereof such as anacardol; alkyl ethers of urushiol, eugenol, isoeugenol, safrole and iso-safrole.

Examples of phenolic radicles of the phenol ethers are those of hydroxybenzene (carbolic acid) and its homologues including various ones of the cresols and xylenols. Examples of unsaturated hydrocarbon substituent radicles are the hydrocarbon substituent in indene, and also the following radicles, the crotyl, allyl, methyl and other derivatives of the allyl, the vinyl, the propenyl, the isopropenyl and the several normal and iso-alkyl and alkoxy derivatives of the vinyl, propenyl and allyl (e. g. methyl and methoxy), and the cyclohexene radicle. These radicles, generally, are olefinic and unsaturated cyclo hydrocarbons, having an unsaturated bond at some place in the radicle.

The aryl nucleus of the phenol which can be condensed with the other substances, can be phenyl, naphthyl, anathranyl and various of the homologues thereof such as those of the various of the cresols and xylenols and of the corresponding or analogous naphthols and anthranols.

Illustrative specific examples of phenolic ethers having an unsaturated hydrocarbon substituent reacted with other phenols are:

*Example 1*

Ethyl ether of cardanol and hydroxybenzene.

*Example 2*

Amyl ether of cardanol and 1,4,2-xylenol.

*Example 3*

Amyl ether of cashew nut shell liquid and cresylic acid.

*Example 4*

Diethyl ether of urushiol and beta-naphthol.

*Example 5*

Eugenol and hydroxybenzene.

*Example 6*

Anethole and ortho cresol.

*Example 7*

Safrole and meta-para-cresol.

The organic condensation reaction products of said phenols with said phenol ethers may be sulphonated by treating the same with a sulphonating agent, such as sulphuric acid, sulphonic acid or the like. The sulphonating is preferably carried out below about 35° C. and the amount of said sulphonating agent is at least 30% and preferably between 30% and 100% of said product by weight.

Example A.—Phenol and ethyl ether of allyl phenol

Equimolecular amounts of phenol (94 grams) and the ethyl ether of allyl phenol (162 grams) were mixed together. To this mixture was added a solution of 100 grams of concentrated sulphuric acid in 450 cc. glacial acetic acid. The entire mixture was heated to boiling under a reflux condenser and kept boiling for five hours. It was then poured into a large volume of water and the oil layer separated. This was distilled in vacuo. There was obtained a viscous, amber-colored oil of the amount of 80 grams. (Product A.)

To 5 grams of this product was added 3 grams of diethyl sulphate and a solution of 2 grams of sodium hydroxide in 18 cc. of water. This mixture was heated to boiling under a reflux condenser for 2 hours, and then the oily layer separated (Product B). The oily layer was the ethyl ether of the above Product A as indicated by the fact that when heated at about 120° C. with hexamethylene tetramine Product B failed to form a resinous mass whereas Product A heated at 120° C. with hexamethylene tetramine did form a resin.

Example B.—Ethyl ether of cashew nut shell liquid and cresols 175 grams of the ethyl ether of cashew nut shell liquid (about ½ mole) and 55 grams of a mixture of the cresols (about ½ mole) were mixed and then chilled in ice water. To this were added slowly 30 cc. of concentrated sulphuric acid at such a rate as to keep the temperature below 25° C. The mixture was agitated throughout the addition of the acid. The finished mixture was then allowed to stand at room temperature overnight. It was then diluted with a large volume of water and salt was added to break the emulsion. A brown viscous oil was obtained and is hereinafter referred to as Product C. When this was heated with 5% of its weight of hexamethylene tetramine at 130° C. it formed a resin which when cured at 325° F. gave a tough, infusible, flexible mass.

In like manner, other alkyl ethers of the unsaturated phenols may be employed such as methyl, propyl, isopropyl, butyl, isobutyl, secondary butyl, amyl, isoamyl, and the various secondary amyl groups.

Products A and B which are essentially the complex phenolic condensation reaction products of one of said phenols and one of said ethers may be sulphonated by placing either of said products in a vessel, at a temperature between about 0° C. and 30° C. and while at this temperature constantly stirring and slowly adding thereto a quantity of a sulphonating agent, and preferably concentrated sulphuric acid in an amount between about 30% to about 100% of the weight of said product. After the last increment of the sulphonating agent has been added thereto, the temperature of the mass is slowly raised to room temperature and allowed to remain about 24 hours at room temperature. Then the excess acid is neutralized and the mass is washed and the resultant sulphonated product is an oily product which is separated therefrom and is found to have good wetting properties for textiles.

Example C 80 grams of Product A is cooled to about 30° C. and while maintained at this temperature and constantly agitated there is added thereto about 35 grams of concentrated sulphuric acid. Then this mass is allowed to stand for 24 hours at room temperature and is then neutralized with dilute NaOH and washed and the resultant sulphonated product is an oily liquid which may be used as a textile wetting agent.

Example D 50 grams of product C was cooled to about 30° C. and while maintained at this temperature and constantly agitated there is added thereto about 30 grams of concentrated sulphuric acid. Then this mass is allowed to stand for 24 hours at room temperature and is then neutralized with dilute NaOH and washed and the resultant sulphonated product is an oily liquid which may be used as a textile wetting agent.

Instead of first preparing the condensation reaction product and then sulphonating, I prefer to produce my novel sulphonated products in a single main step. The condensing agent for the reaction between the phenol and the phenol ether is one which also serves as a sulphonating reagent and is present in sufficient quantity for the sulphonation reaction. In this procedure I prefer to use sulphuric acid as the sulphonating reagent and condensing agent and is preferably present in an amount equal to at least about 40% of the combined weights of the phenol and phenol ether to be reacted.

The following examples are merely illustrative of this, a single main step reaction.

Example E 164 grams of eugenol and 94 grams of phenol are added together and the solution cooled to below 30° C. To this is added slowly with stirring 100 grams of concentrated sulphuric acid. This mixture is allowed to stand 24 hours at room temperature and then neutralized with dilute NaOH solution and the water salt thereof removed and the resultant sulphonated product is an oily layer which may be used as a wetting agent.

Example F 162 grams of safrole and 92 grams of phenol are added together and the solution cooled to below 30° C. To this is added slowly with stirring 100 grams of concentrated sulphuric acid. This mixture is allowed to stand 24 hours at room temperature and then neutralized with dilute NaOH solution and the water salt thereof removed and the resultant sulphonated product is an oily layer which may be used as a wetting agent.

Example G 162 grams of ethyl ether of cardanol and 94 grams of phenol were mixed together to which mixture was added slowly with stirring and keeping the temperature below 30° C., 125 grams of concentrated sulfuric acid. This was allowed to stand 24 hours at room temperature and then neutralized and washed to remove the acidity. The resultant sulphonated oily product was found to give excellent wetting properties.

While this invention has been described in detail, it is not to be limited thereby because various modifications and changes may be made thereto without departing from the spirit thereof.

Having thus described my invention, what I claim and desire to protect by Letters Patent is:

1. The method comprising sulphonating an organic condensation reaction product produced by subjecting a mixture of a phenol free of unsaturated hydrocarbon substituents with an alkyl ether of a phenol having an unsaturated hydrocarbon substituent to a condensing reaction in the presence of a katenoid condensing agent.

2. The method comprising sulphonating an organic condensation reaction product produced by subjecting a mixture of a phenol free of unsaturated hydrocarbon substituents with an alkyl ether of cardanol to a condensing reaction in the presence of a katenoid condensing agent.

3. The method comprising sulphonating an organic condensation reaction product produced by subjecting a mixture of a phenol free of unsaturated hydrocarbon substituents with an alkyl ether of cashew nut shell liquid to a condensing reaction in the presence of a katenoid condensing agent.

4. A method comprising sulphonating an organic condensation reaction product produced by subjecting a mixture of an alkyl ether of cardanol and hydroxybenzene to a condensing reaction in the presence of a katenoid condensing agent.

5. The method comprising sulphonating an organic condensation reaction product produced by subjecting a mixture of an alkyl ether of cashew nut shell liquid and hydroxybenzene to a condensing reaction in the presence of a katenoid condensing agent.

6. The method comprising sulphonating an organic condensation reaction product produced by subjecting a mixture of an alkyl ether of cardanol and a xylenol to a condensing reaction in the presence of a katenoid condensing agent.

7. A sulphonated organic product produced by sulphonating an organic condensation reaction product produced by subjecting a mixture of a phenol free of unsaturated hydrocarbon substituents with an alkyl ether of a phenol having an unsaturated hydrocarbon substituent to a condensing reaction in the presence of a katenoid condensing agent.

8. A sulphonated organic product produced by sulphonating an organic condensation reaction product produced by subjecting a mixture of a phenol free of unsaturated hydrocarbon substituents with an alkyl ether of cardanol to a condensing reaction in the presence of a katenoid condensing agent.

9. A sulphonated organic product produced by sulphonating an organic condensation reaction product produced by subjecting a mixture of a phenol free of unsaturated hydrocarbon substituents with an alkyl ether of cashew nut shell liquid to a condensing reaction in the presence of a katenoid condensing agent.

10. A sulphonated organic product produced by sulphonating an organic condensation reaction product produced by subjecting a mixture of an alkyl ether of cardanol and hydroxybenzene to a condensing reaction in the presence of a katenoid condensing agent.

11. A sulphonated organic product produced by sulphonating an organic condensation reaction product produced by subjecting a mixture of an alkyl ether of cashew nut shell liquid and hydroxybenzene to a condensing reaction in the presence of a katenoid condensing agent.

12. A sulphonated organic product produced by sulphonating an organic condensation reaction product produced by subjecting a mixture of an alkyl ether of cardanol and a xylenol to a condensing reaction in the presence of a katenoid condensing agent.

MORTIMER T. HARVEY.